US008660966B2

(12) United States Patent
Viidu et al.

(10) Patent No.: US 8,660,966 B2
(45) Date of Patent: Feb. 25, 2014

(54) PAYMENT SYSTEM AND METHOD

(75) Inventors: Siim Viidu, London (GB); Edith Coenen, Guildford (GB); Andres Kutt, Tallinn (EE); Kristen Ondeck, Pleasanton, CA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/848,936

(22) Filed: Aug. 31, 2007

(65) Prior Publication Data
US 2009/0063353 A1 Mar. 5, 2009

(51) Int. Cl.
*G06Q 20/00* (2012.01)

(52) U.S. Cl.
USPC ............... 705/75; 705/64; 705/65; 705/76; 705/77; 705/78; 705/79

(58) Field of Classification Search
USPC .......................................... 705/64, 65, 75–79
See application file for complete search history.

(56) References Cited

U.S. PATENT DOCUMENTS

| | | | | |
|---|---|---|---|---|
| 6,731,314 | B1 * | 5/2004 | Cheng et al. ................. | 715/848 |
| 7,487,214 | B2 * | 2/2009 | Qureshi et al. ............... | 709/206 |
| 2002/0035605 | A1 * | 3/2002 | McDowell et al. ........... | 709/206 |
| 2003/0030670 | A1 * | 2/2003 | Duarte et al. ................ | 345/758 |
| 2004/0017396 | A1 * | 1/2004 | Werndorfer et al. ......... | 345/751 |
| 2004/0141594 | A1 * | 7/2004 | Brunson et al. ........... | 379/88.12 |
| 2004/0186766 | A1 * | 9/2004 | Fellenstein et al. ............. | 705/14 |
| 2004/0230536 | A1 * | 11/2004 | Fung et al. ....................... | 705/64 |
| 2004/0254848 | A1 * | 12/2004 | Golan et al. ..................... | 705/26 |
| 2005/0097000 | A1 * | 5/2005 | Freishtat et al. ................ | 705/26 |
| 2005/0097040 | A1 * | 5/2005 | Chen et al. ...................... | 705/40 |
| 2005/0108341 | A1 * | 5/2005 | Mathew et al. ............... | 709/206 |
| 2005/0261964 | A1 * | 11/2005 | Fang .................................. | 705/14 |
| 2006/0156063 | A1 * | 7/2006 | Mazzarella et al. ............ | 714/12 |
| 2006/0168054 | A1 * | 7/2006 | Burkhart et al. .............. | 709/206 |
| 2007/0011104 | A1 * | 1/2007 | Leger et al. ..................... | 705/77 |
| 2007/0050371 | A1 * | 3/2007 | Johnson et al. ................. | 707/10 |
| 2007/0174403 | A1 * | 7/2007 | Barry .............................. | 709/207 |
| 2007/0198432 | A1 * | 8/2007 | Pitroda et al. ................... | 705/64 |
| 2007/0208816 | A1 * | 9/2007 | Baldwin et al. ............... | 709/206 |
| 2007/0219901 | A1 * | 9/2007 | Garbow et al. ................. | 705/39 |

FOREIGN PATENT DOCUMENTS

EP 1693795 A2 * 8/2006
WO WO 2005/009019 1/2005

OTHER PUBLICATIONS

"The Secure Hypertext Transfer Protocol." Aug. 1999. Network Working Group. All pages. http://tools.ietf.org/pdf/rfc2660.pdf.*
"What is Instant Messaging?" Webopedia. May 14, 2004. Page 1. http://www.webopedia.com/TERM/I/instant_messaging.html.*

(Continued)

*Primary Examiner* — Calvin Cheung
(74) *Attorney, Agent, or Firm* — Sonia Cooper; Jim Ross; Micky Minhas

(57) ABSTRACT

In one embodiment, transferring payment between a first user and a second user of a communication system includes displaying a contact list in a user interface of a client executed at a user terminal of the first user, the contact list including the second user. The client retrieves and displays at least one page from a payment provider responsive to the first user selecting the second user from the contact list. The client transmits, to the payment provider, information related to the payment entered into the page by the first user, which causes the payment provider to transfer the payment from an account of the first user to an account of the second user.

48 Claims, 13 Drawing Sheets

(56) References Cited

OTHER PUBLICATIONS

Basat et. al. "An Analysis of the Skype Peer-to-Peer Internet Telephony Protocol." Sep. 15, 2004. All pages.*

Hirsh, L. "Instant Messaging: The Next E-Commerce Channel." Apr. 6, 2002. E-Commerce Times. All pages. http://www.ecommercetimes.com/story/17345.html?wlc=1277221230.*

"Instant Transaction Messaging." Nov. 20, 2002. Netrana. All pages. Retrieved on Jun. 23, 2010 via Wayback Machine.*

Tyson, J. "How Instant Messaging Works." May 10, 2007. How Stuff Works Website. All pages. Retrieved on Jun. 23, 2010 via Wayback Machine.*

"Internet Message Access Protocol—Version 4rev1." Mar. 2003. Network Working Group. All pages.*

Good., R, "Instant Messaging Tools and Technology: A Mini-Guide", Kolabora.com, Sep. 28, 2006, All pages, retrieved on Nov. 23, 2010, <http://web.archive.org/web/20061004222305/www.kolabora.com/news/2006/09/28/instant_messaging_tools_and_technology.htm>.*

Max et. al., "Skype: The Definitive Guide", May 5, 2006, Que Publishing, All pages, retrieved from Safari Books Online.*

* cited by examiner

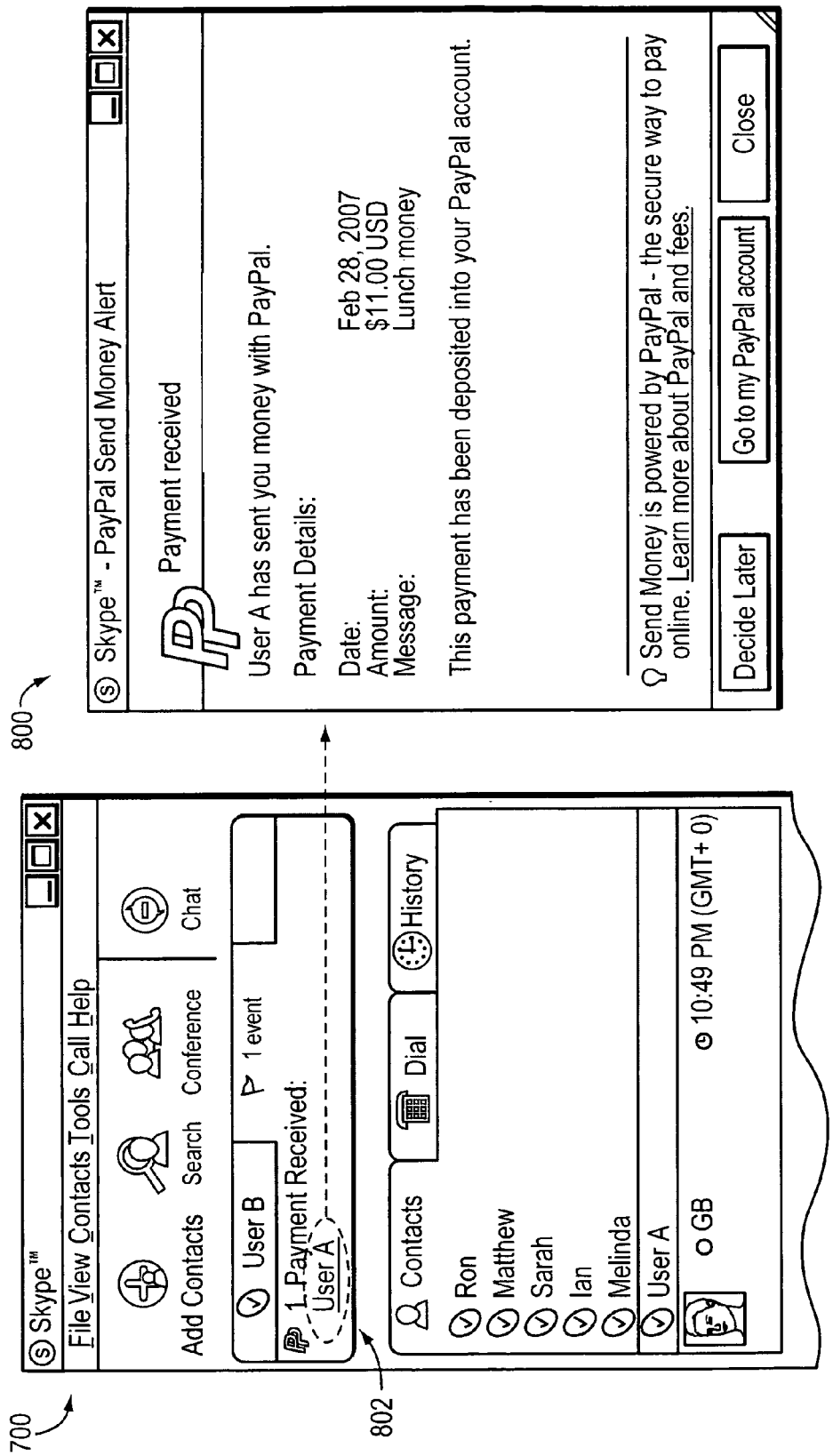

PAYMENT SYSTEM AND METHOD

BACKGROUND OF THE INVENTION

Voice over internet protocol ("VoIP") communication systems allow the user of a device, such as a personal computer, to make calls across a computer network such as the Internet. These systems are beneficial to the user as they are often of significantly lower cost than fixed line or mobile networks. This may particularly be the case for long distance calls. To use VoIP, the user must install and execute client software on their device. The client software provides the VoIP connections as well as other functions such as registration and authentication. In addition to voice communication, the client may also provide video calling and instant messaging ("IM").

One type of VoIP communication system uses a peer-to-peer ("P2P") topology built on proprietary protocols. To access the peer-to-peer system, the user must execute P2P client software provided by a P2P software provider on their PC, and register with the P2P system. When the user registers with the P2P system the client software is provided with a digital certificate from a server. Once the client software has been provided with the certificate communication can subsequently be set up and routed between users of the P2P system without the further use of a server. In particular, the users can establish their own communication routes through the P2P system based on exchange of one or more digital certificates (or user identity certificates, "UIC") to acquire access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

VoIP communication systems therefore have a valuable resource in that each user has a contact list of other VoIP system users (contacts). This provides a level of trust between the users. Currently, however, these contact lists are only used for initiating communication events between the user and contact or contacts (e.g. VoIP calls, IM chat, video calls, file transfers, etc.)

SUMMARY

According to one aspect of the present invention there is provided a method of transferring a payment between a first user of a communication system and a second user of the communication system, comprising: displaying a contact list in a user interface of a client executed at a user terminal of the first user, said contact list comprising said second user; said client retrieving and displaying at least one page from a payment provider responsive to said first user selecting the second user from the contact list and receiving information related to said payment entered into said at least one page by said first user; and said client transmitting said information related to said payment to said payment provider to cause said payment provider to transmit a message to a user terminal of the second user over the communication system and transfer said payment from an account of the first user to an account of the second user.

In one embodiment, the communication system is a voice over internet protocol communication system. In another embodiment, the communication system is an instant messaging communication system.

Preferably, the step of said first user selecting the second user comprises detecting the activation by the first user of a displayed name of the second user displayed in the user interface of the client. Preferably, the client is a computer program downloaded and executed on the user terminal of the first user.

Preferably, said step of retrieving said at least one page from the payment provider comprises downloading said at least one page over the Internet. Preferably, said downloading of said at least one page over the Internet uses a secure protocol.

Preferably, said step of displaying said at least one page from the payment provider comprises said client triggering the display of a pop-up window, wherein said at least one page is displayed in said pop-up window.

Preferably, said information related to said payment is transmitted to said payment provider over the Internet. Preferably, said information related to said payment is transmitted over the Internet using a secure protocol. Preferably, said information related to said payment comprises payment provider authorisation information for the first user. Preferably, said payment provider authorisation information for the first user comprises a payment provider username and a payment provider password. Preferably, the username is an email address for the first user.

Preferably, said information related to said payment comprises an identity of the second user in the communication system. Preferably, the identity of the second user in the communication system comprises a communication system username of the second user. Preferably, said information related to said payment comprises at least one of a payment amount, a currency, and a message.

In one embodiment, said message transmitted by said payment provider is transmitted to a secure interface of a messaging system over the Internet, and forwarded by said messaging system over said communication system to the user terminal of the second user. In another embodiment, said message transmitted by said payment provider is an email message transmitted to an email address of the second user. In another embodiment, said message transmitted by said payment provided is an SMS message transmitted to a telephone number of said second user.

Preferably, the method further comprises the step of said user terminal of the second user receiving said message in a client program executed at the user terminal of the second user. Preferably, the method further comprises the steps of authorising said second user with the communication system, authorising said second user with the payment provider, and transmitting an acceptance message from said user terminal of said second user to said payment provider to initiate the transfer of said payment.

Preferably, the method further comprises the step of linking authorisation information of the second user in the communication system with authorisation information of the second user in the payment provider, such that, for subsequent payments, the steps of authorising said second user with the communication system and authorising said second user with the payment provider are not required, and the step of transferring said payment is initiated without transmitting an acceptance message from the user terminal of the second user. Preferably, the step of linking comprises storing the authorisation information of the second user in the communication system and the authorisation information of the second user in the payment provider at a network node. Preferably, the authorisation information of the second user in the communication system is a communication system username of the second user, and the authorisation information of the second user in the payment provider is a payment provider username of the second user.

Preferably, the communication system is a peer-to-peer communication system.

According to another aspect of the present invention, there is provided a computer program product comprising program code means which when executed by a computer implement the steps according to the above-defined method of transferring a payment.

According to another aspect of the present invention, there is provided a system for transferring a payment between a first user of a communication system and a second user of the communication system, comprising: a user terminal of said first user arranged to execute a client and display a contact list in a user interface of said client, said contact list comprising said second user; and a payment provider; wherein said client is configured to retrieve and display at least one page from the payment provider responsive to said first user selecting the second user from the contact list, receive information related to said payment entered into said at least one page by said first user, and transmit said information related to said payment to said payment provider; and wherein the payment provider is arranged to transmit a message from said payment provider to a user terminal of the second user over the communication system responsive to receiving said information related to said payments, and transfer said payment from an account of the first user to an account of the second user.

According to another aspect of the present invention, there is provided a user terminal for transferring a payment between a first user of a communication system and a second user of the communication system, comprising: a processor arranged to execute a client; and a display arranged to display a contact list to said first user in a user interface of said client, said contact list comprising said second user; wherein said client is configured to retrieve and display at least one page from a payment provider responsive to said first user selecting the second user from the contact list, receive information related to said payment entered into said at least one page by said first user, and transmit said information related to said payment to said payment provider to cause said payment provider to transmit a message to a user terminal of the second user over the communication system responsive to receiving said information related to said payments and transfer said payment from an account of the first user to an account of the second user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6C shows an account creation UI displayed to a sender of money;

FIG. 6D shows an account log-in UI displayed to a sender of money;

FIG. 8A shows a VoIP client UI displayed to a repeat receiver of money; and

FIG. 8B shows a confirmation UI displayed to a repeat receiver of money.

DETAILED DESCRIPTION

One very common operation that is performed between acquaintances is the exchange of money. In particular, this frequently happens between friends and family members. For example, if two friends have been out for lunch, and the one friend has paid for the meal, then the other may want to reimburse the payer. Another common scenario is that one person buys a set of tickets (e.g. cinema tickets) which the other attendees to the ticketed event need to pay for. A further common scenario involves expatriates sending money back to their home country. Typically, this might involve larger amounts of money than the other examples above. Many other such scenarios exist, and are extremely common.

Currently, these types of payments are typically made using cash, cheques, or bank transfers. Cash payments are inconvenient if the parties do not meet regularly. Cheques are inconvenient to the person receiving the cheque, as they need to visit a bank to pay the cheque into their account. Bank transfers can be performed online, but this has the disadvantage of needing to know the bank account details of the person who is being paid.

The same groups of people that exchange these quantities of money are also generally the same people that are stored in contact lists in the VoIP system. It is therefore advantageous to provide a system and method whereby money can be exchanged between the contacts in the VoIP system, utilising the pre-existing authorisation scheme present in the VoIP system (thereby avoiding as much further authorisation as possible and hence simplifying the procedure for the user) whilst maintaining the security provided by a specialised payment provider. Note that the embodiment described below is described with reference to a VoIP communication system, but it will be appreciated that other types of communication system can also be used, such as instant messaging communication systems.

Figure 1:
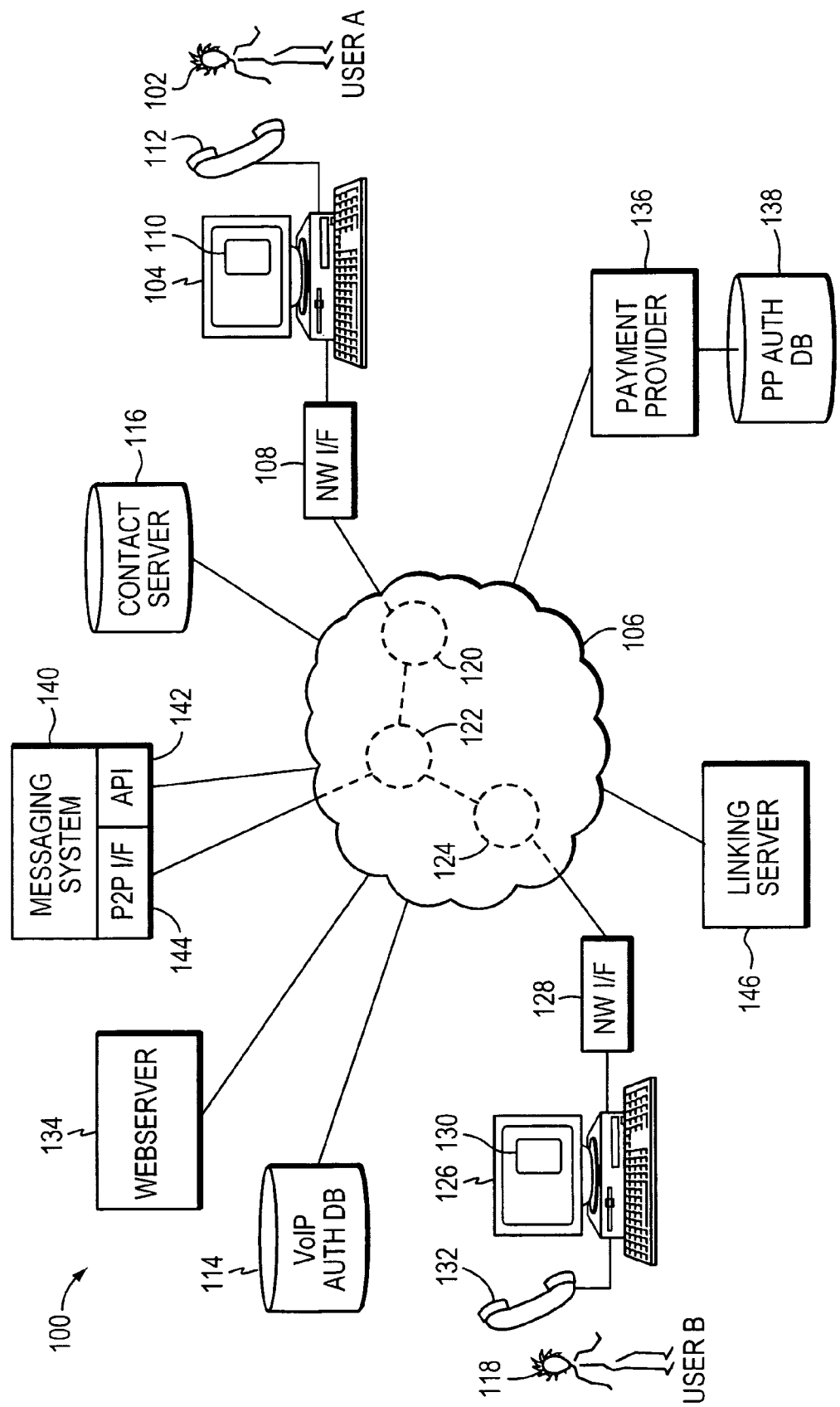
FIG. 1 shows a system for enabling the transfer of money using a VoIP communication network.

Reference is now made to FIG. 1, which illustrates a system 100 for enabling the transfer of money using a VoIP communication system. In the embodiment shown in FIG. 1, a P2P communication system is illustrated, although it will be understood that other forms of communication could also be used.

A first user of the VoIP communication system (denoted "User A" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user device has a user interface to receive information from and output information to a user of the device. In a preferred embodiment of the invention the user interface of the user device comprises a display such as a screen and a keyboard and mouse. The user terminal 104 is connected to the network 106 via a network interface 108 such as a modem, and the connection between the user terminal 104 and the network interface 108 may be via a cable (wired) connection or a wireless connection.

The user terminal 104 is running a client 110, provided by the VoIP software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a handset, but can be in the form of a headphone or earphone with an integrated microphone, or as a separate loudspeaker and microphone independently connected to the user terminal 104.

Figure 2:
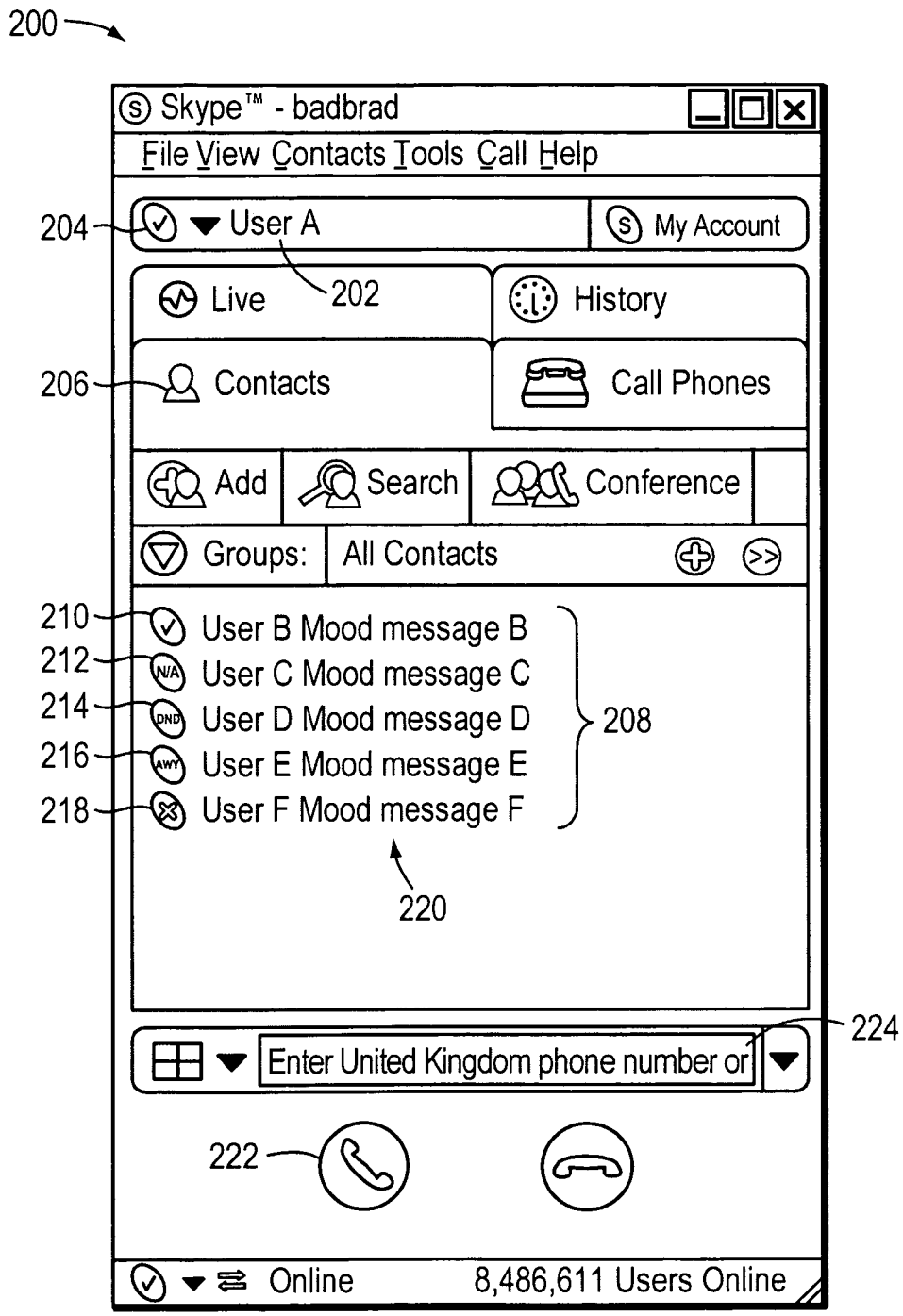
FIG. 2 shows a user interface ("UI") of a VoIP client.

An example of a user interface 200 of the client 110 executed on the user terminal 104 of User A 102 is shown illustrated in FIG. 2. The client user interface 200 displays the username 202 of User A 102 in the VoIP system, and User A can set his own presence state (that will be seen by other users) using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the VoIP system (User B to F) are shown listed in contact list 208. Each of these contacts have authorised the user of the client 106 to view their contact details and online presence and mood message information. Each contact in the contact list has a presence status icon associated with it. For example, the presence status icon for User B 210 indicates that User B is "online", the presence icon for User C 212 indicates that User C is "not available", the presence icon for User D 214 indicates that User D's state is "do not disturb", the presence icon for User E 216 indicates User E is "away", and the presence icon for User F 218 indicates that User F is "offline". Further presence indications can also be included. Next to the names of the contacts in pane 208 are mood messages 220 of the contacts.

Figure 3:
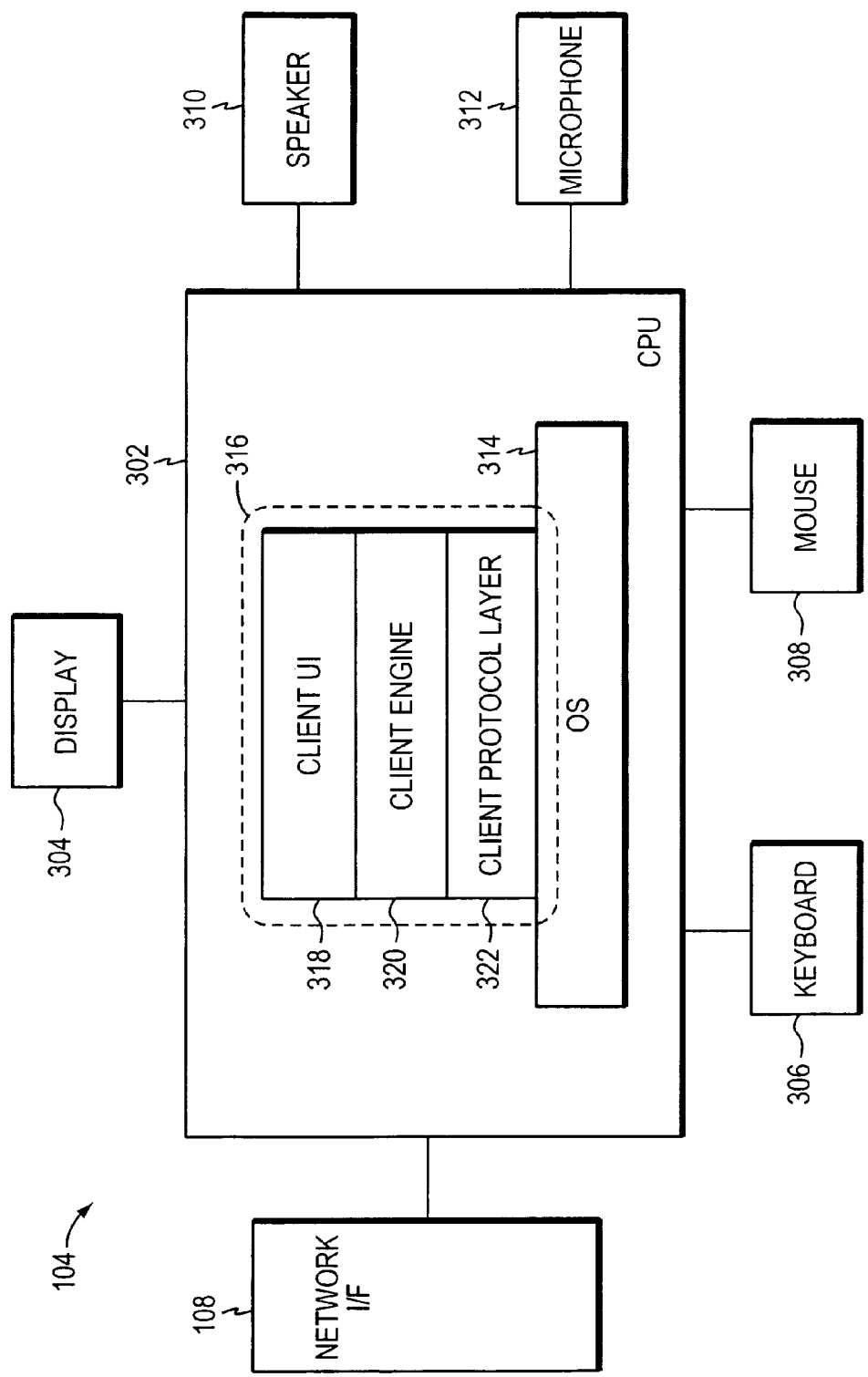
FIG. 3 shows a detailed view of a user terminal executing a VoIP client.

FIG. 3 illustrates a detailed view of the user terminal (104) on which is executed client 110. The user terminal 10 comprises a central processing unit ("CPU") 302, to which is connected a display 304 such as a screen, an input device such as a keyboard 306, a pointing device such as a mouse 308, a speaker 310 and a microphone 312. The speaker 310 and microphone 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 322, a client engine layer 320 and a client user interface ("UI") layer 318. Each layer is responsible for specific functions. Because each layer usually communicates with two other layers only, they are regarded as being arranged in a stack as shown in FIG. 3. The operating system 314 manages the hardware resources of the computer and handles data being transmitted to and from the network via the network interface 108. The client protocol layer 322 of the client software communicates with the operating system 314 and manages the connections over the VoIP system. Processes requiring higher level processing are passed to the client engine layer 320, which handles the processing required for the user to make and receive calls over the VoIP system. The client engine 320 also communicates with the user client user interface layer 318. The client engine 320 may be arranged to control the client user interface layer 318 to present information to the user via the user interface of the client (as shown in FIG. 2) and to receive information from the user via the user interface. The control of the client user interface 318 will be explained in more detail hereinafter.

Figure 4:
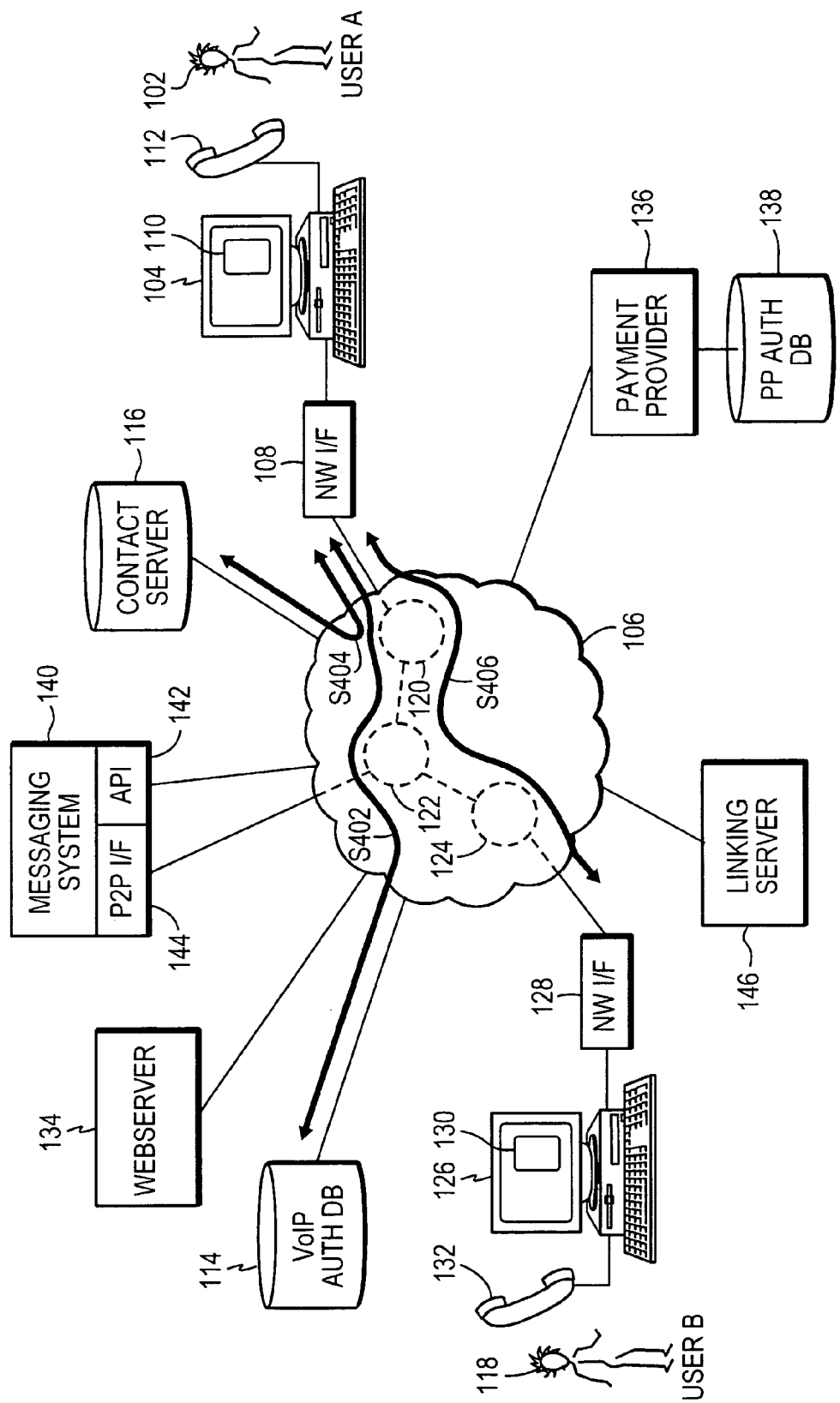
FIG. 4 shows the process for a user to authenticate with the VoIP system and initiate a call.

Reference is now made to FIG. 4, which illustrates the process for User A 102 to authenticate with the VoIP system and initiate a call with another user (called User B 118) in the system illustrated in FIG. 1.

When User A 102 first registers with the VoIP system the client 110 is provided with a digital certificate from a VoIP authentication server 114, as illustrated in step S402. As mentioned, once the client 110 has been provided with the digital certificate, communication can subsequently be set up and routed between users of the VoIP communication system without the further use of a server, due to the P2P nature of this example system. Furthermore, subsequent to the initial registration with the VoIP system, the user must also provide a username (referred to hereinafter as a VoIP ID) and password in order to log-in to the VoIP system and view their contact list and make calls. This is performed by the user entering the username (VoIP ID) and password into the client 110, and the username and password are then authenticated with the VoIP authentication server 114. Alternatively, these authentication details may be stored by the client 110, so that the user does not need to manually enter them every time the client is executed, but the stored details are still passed to the VoIP authentication server 114 to be authenticated.

The contact list for the users (e.g. the contact list 208 for User A) is stored in a contact server 116 shown in FIG. 1. When the client 110 first logs into the VoIP system the contact server is contacted (in step S404), and the contact list is downloaded to the user terminal 104. This allows the user to log into the VoIP system from any terminal and still access the same contact list. The client 110 also periodically communicates with the contact server 113 in order to obtain any changes to the information on the contacts in the contact list, or to update the stored contact list with any new contacts that have been added. Presence information is not stored centrally in the contact server. Rather, the client 112 periodically requests the presence information for each of the contacts in the contact list 208 directly over the VoIP system.

In step S406, a call is made between User A 102 and User B 118. Calls to the users in the contact list may be initiated over the VoIP system by selecting the contact listed in the client 110 and clicking on a "call" button 222 (as shown in FIG. 2) using a pointing device such as a mouse. Alternatively, the call may be initiated by typing in the VoIP identity of a contact in the field 224. Referring again to FIG. 4, the call set-up is performed using proprietary protocols, and the route over the Internet 106 between the calling user and called user is determined by the peer-to-peer system without the use of servers. In FIG. 4, an illustrative route is shown between the caller User A (102) and the called party, User B (118), via other peers (120, 122, 124) of the system. It will be understood that this route is merely an example, and that the call may be routed via fewer or more peers.

Following authentication through the presentation of the digital certificates (to prove that the users are genuine subscribers of the VoIP system—described in more detail in WO 2005/009019 (incorporated herein by reference in its entirety), the call can be made using the transmission of VoIP packets. The client 110 performs the encoding and decoding of VoIP packets. VoIP packets from the user terminal 104 are transmitted into the Internet 106 via the network interface 108, and routed by the VoIP system to the computer terminal 126 of User B 118, via a network interface 128. A client 130 (similar to the client 110) running on the user terminal 126 of User B 118 decodes the VoIP packets to produce an audio signal that can be heard by User B 118 using the handset 132. Conversely, when User B 118 talks into handset 132, the client 130 executed on user terminal 126 encodes the audio signals into VoIP packets and transmits them across the Internet 106 to the user terminal 104. The client 110 executed on user terminal 104 decodes the VoIP packets from User B 114, and produces an audio signal that can be heard by the user of the handset 112.

The VoIP packets for the P2P call described above are passed across the Internet 106 only, and the public switched telephone network ("PSTN") is not involved. Furthermore, due to the P2P nature of the system, the actual voice calls between users of the VoIP system can be made with no servers being used. This has the advantages that the network scales easily and maintains a high voice quality, and the call can be made free to the users.

Figure 5:
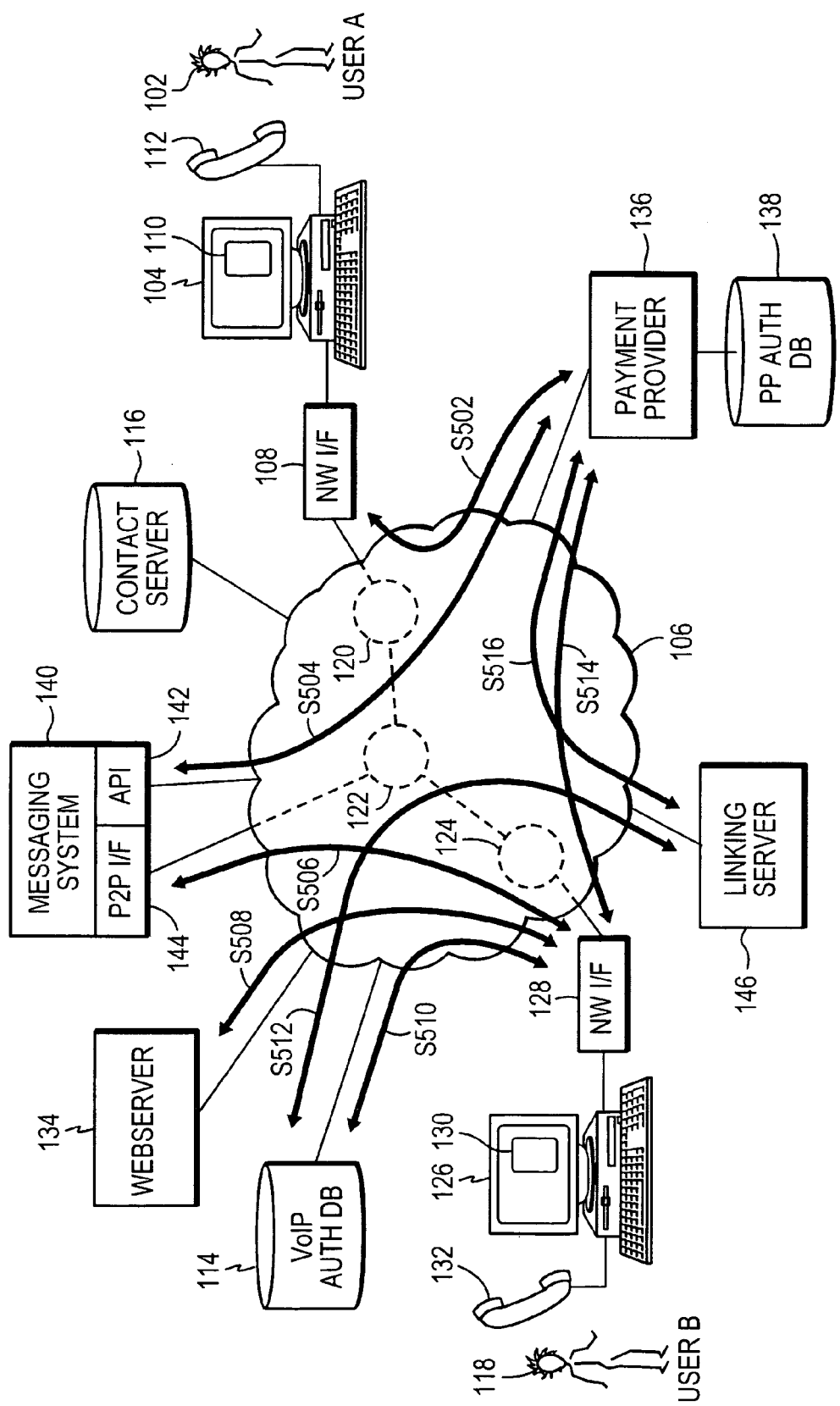
FIG. 5 shows the process for a user to transfer a payment to a contact using the VoIP system.

Reference is now made to FIG. 5, which illustrates a technique for utilising the VoIP system to enable the transfer of payments between a first user of the VoIP system and a contact of the first user. Specifically, FIG. 5 shows the steps involved in the transfer of payments for the system of FIG. 1.

Figures 6A, 6B:
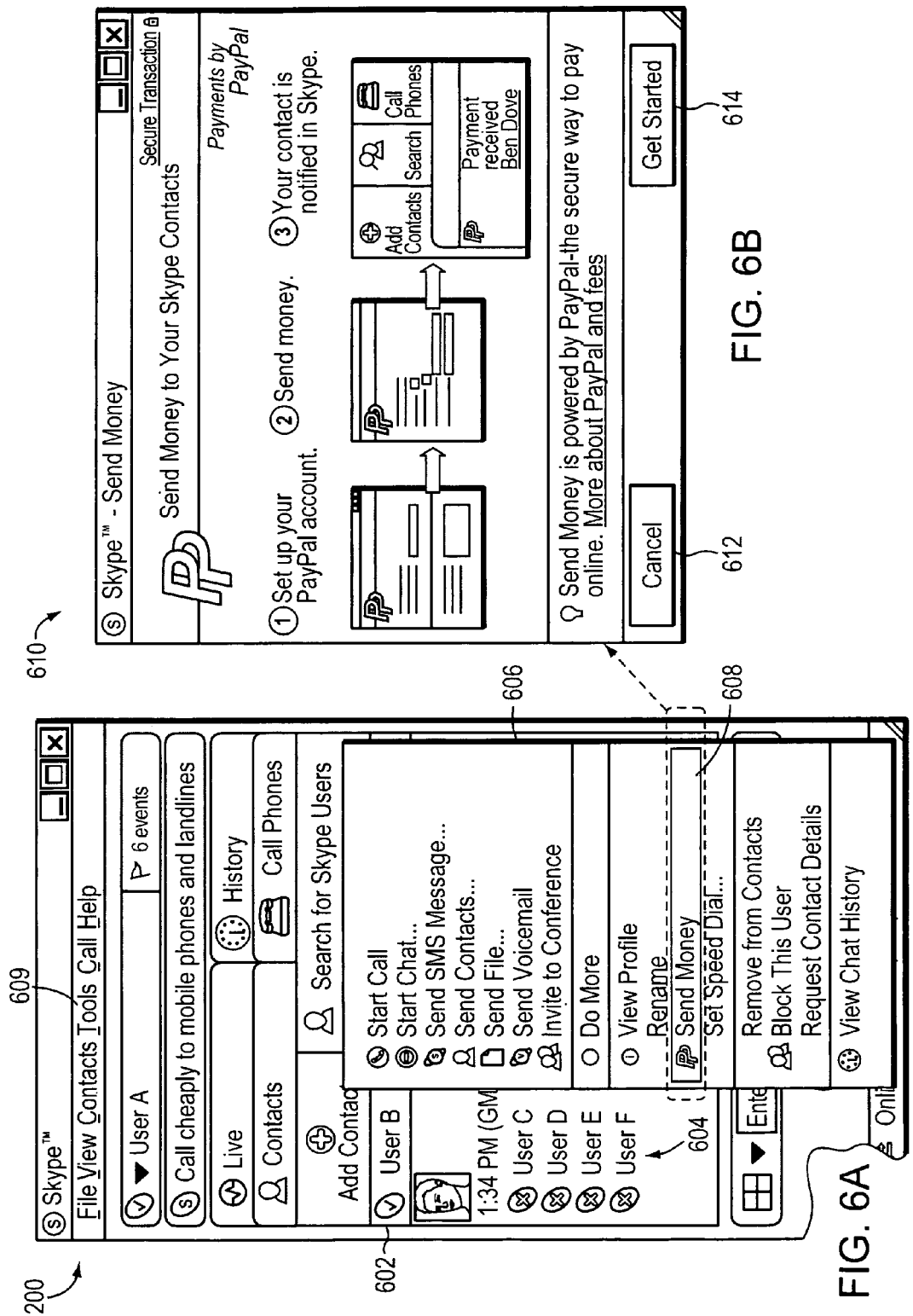
FIG. 6A shows a VoIP client UI when selecting to send money to a contact.
FIG. 6B shows an introductory UI displayed to a first-time sender of money.

In the example shown in FIG. 5, User A 102 is using the VoIP system to initiate a payment to User B 118. The first step in this process is for User A 102 to use the VoIP client 110 executed on user terminal 104 to select a contact from his contact list (208 in FIG. 2) to determine to whom a payment should be made. This is illustrated with reference to the client UI shown in FIG. 6A. FIG. 6A shows a client UI 200 similar to that shown in FIG. 2, as executed on user terminal 104 of User A 102. In FIG. 6A, the contact entry 602 for User B 118 shown in contact list 604 has been selected using the pointing device, and a drop-down menu 606 has been activated for User B's contact.

Drop-down menu 606 contains an option 608 entitled "Send Money", and this option 608 is selected by User A 102 using the pointing device. The selection of option 608 initiates the process of transferring money to User B 118. Note that the "Send Money" option can also be selected from other parts of the client UI. For example, a "Send Money" option can be located in the "tools" menu 609 of the client, or from a drop-down menu associated with a contact displayed during an IM chat.

When option 608 is selected, client 110 controls the opening of a pop-up window that is used to display user interface screens that contain fields that control and initiate the sending of money from User A 102 to User B 118. Note that the user interface screens described below illustrate an example sequence of screens, and the precise presentation and order of information can be changed in alternative embodiments.

If this is the first time that User A has used the VoIP client 110 to send money to a contact, then the pop-up window shows an introductory page 610 illustrated in FIG. 6B. The introductory page 610 shown in FIG. 6B is fetched under the control of client 110 from a payment provider 136. This is shown as step S502 in FIG. 5. Page 610 is an introductory screen this is only displayed when a user uses the send money functionality for the first time. The introductory page 610 simply explains the steps that need to be taken to send money to a contact, so that the user knows what to expect. There are two buttons at the bottom of page 610. Firstly, there is a "cancel" button 612, which, when activated, closes the pop-up window and cancels the send money process. Secondly, there is a "get started" button 614, which, when activated, replaces page 610 with account creation page 616 shown in FIG. 6C.

Figures 6C, 6D:
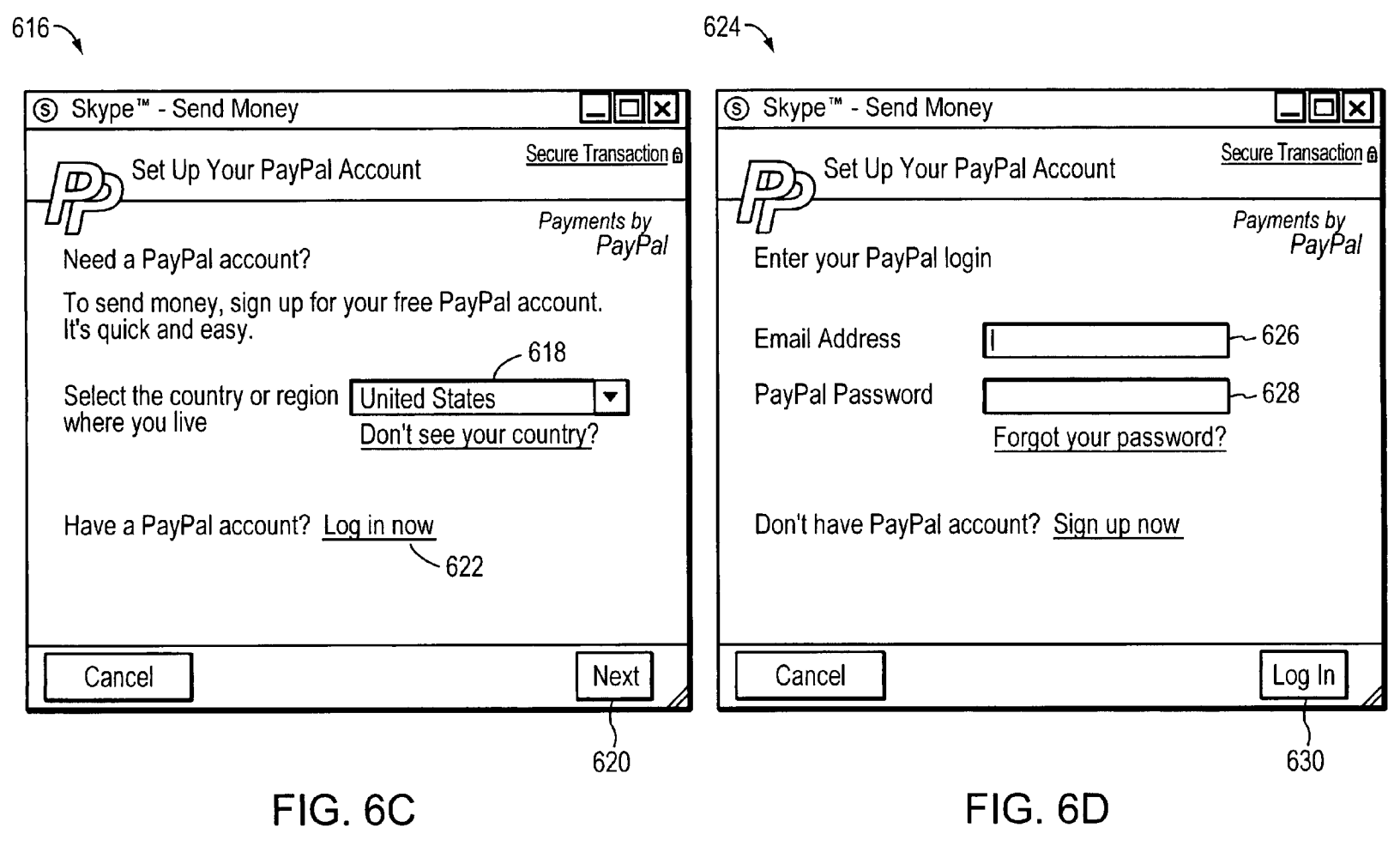

Account creation page 616 shown in FIG. 6C allows User A to set up an account with the payment provider 136. An example payment provider is PayPal™. The account creation page 616 is provided from the server operated by the payment provider 136, as shown in step S502 in FIG. 5. All communication between the client 110 and the payment provider 136 in step S502 uses a secure communication protocol. An example of such as secure protocol is HTTPS, although other protocols could also be used.

If User A 102 does not already have an account with the payment provider 136, then he can set one up by selecting his country from the drop-down list 618, and then selecting the "next" button 620. Responsive to clicking the next button, the pop-up window displays a sequence of screens that allows the user to enter the personal data required to create an account with the payment provider (such as name, address, email address, password, payment card details etc.) The precise nature of the details that are entered by the user are dependent on the payment provider, and are not described further here. However, it should be noted that the user setting up an account with the payment provider needs to provide details of a payment source, from which funds may be taken, such as a credit/debit card or bank account details.

Alternatively, if User A 102 already has an account with the payment provider 136, he can select the link 622 labelled "log in now", and will then be presented with log-in page 624 shown in FIG. 6D. This page is also provided by the payment provider 136 in FIG. 5. Log-in page 624 has fields for the user to enter an email address 626 (this acts as the payment provider username in this example) and password 628, and this information is sent to the payment provider 136 when the user selects the "login" button 630. These log-in details are verified by a payment provider authorisation database 138 (as shown in FIG. 5). Note that the username (i.e. email address) that is used as part of the user's authorisation with the payment provider 136 is distinct from the username of the user in the VoIP system (i.e. the user's VoIP ID).

Note that the pages shown in FIGS. 6B and 6C are only shown to the user when he first uses the send money functionality. For repeat uses of the functionality, the user is displayed the log-in page 624 immediately, without being shown the introductory page 610 or the account creation page 616.

Figures 6E, 6F:
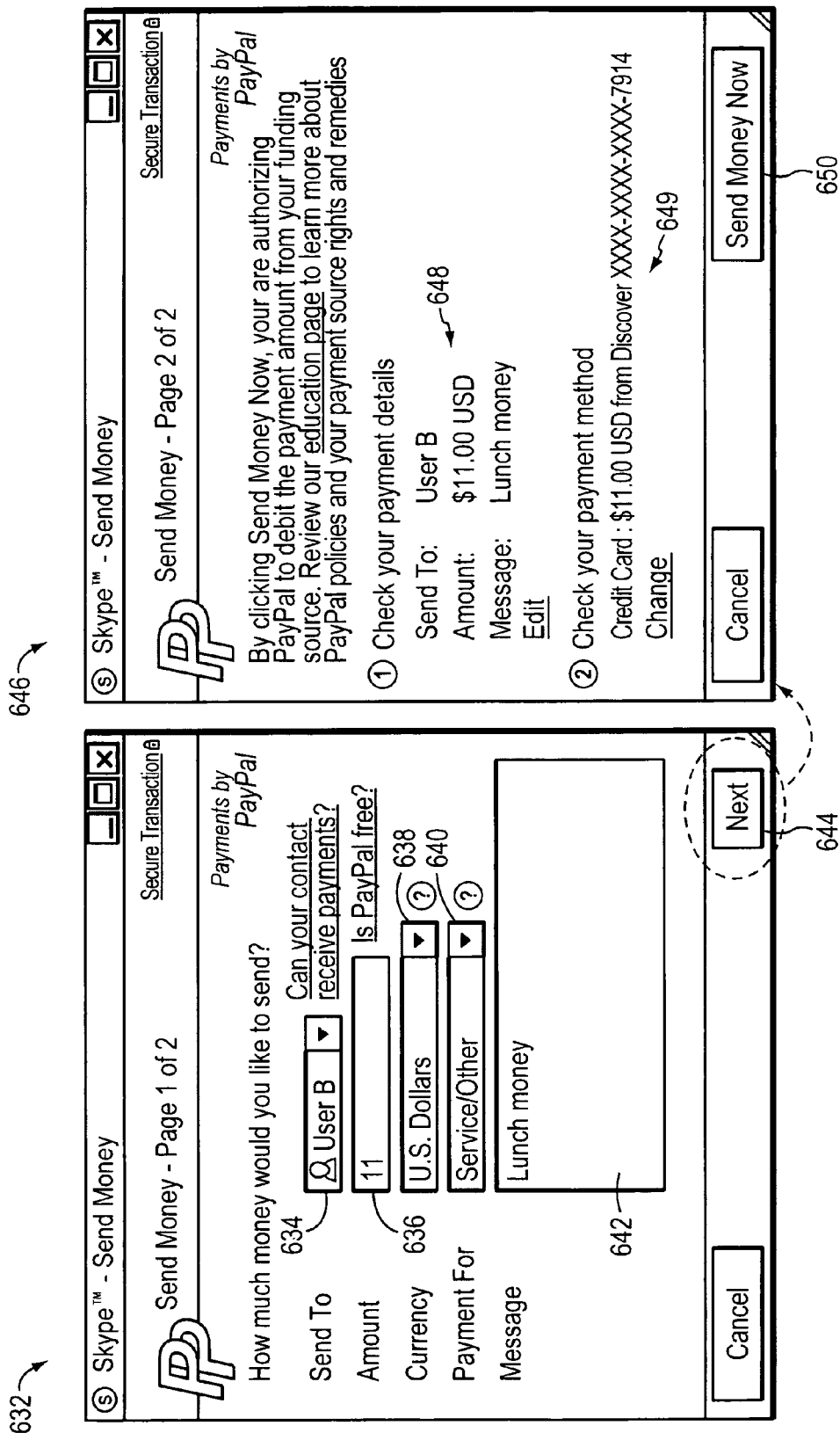
FIG. 6E shows a money transfer UI displayed to a sender of money.
FIG. 6F shows a confirmation UI displayed to a sender of money.

Once User A 102 has entered his log-in details, and been authorised with the payment provider 136, then information regarding the payment to be made is required. This information is entered in a money transfer page illustrated in FIG. 6E. The pop-up window in FIG. 6E shows a money transfer page 632, in which User A 102 enters the details of the money to be sent. Money transfer page 632 is provided by the payment provider 136 (as part of step S502 in FIG. 5). Contact field 634 allows the user to set to the contact in the VoIP system to which the money should be sent. This is initially set to the contact selected in the client UI 200, as shown in FIG. 6A (User B 118 in this example). The amount of money to be sent and the currency are entered in fields 636 and 638, respectively. A category for the reason for the payment is selected from drop-down list 640, and a message to accompany the payment can be entered in field 642. When this information has been entered by User A 102, he can activate a "next" button 644.

Figure 6G:
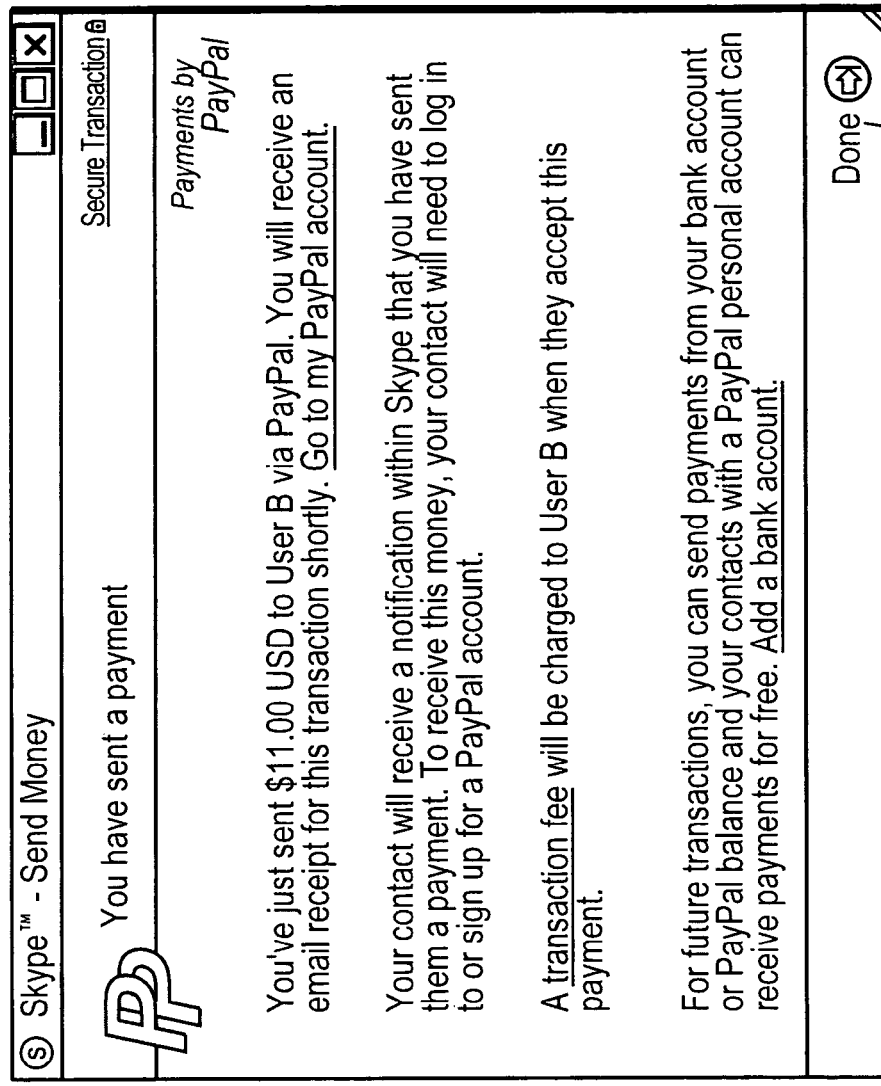
FIG. 6G shows a money transfer summary UI displayed to a sender of money.

In response to activating the "next" button 644, the pop-up window displays confirmation page 646 shown in FIG. 6F. Confirmation page 646 is provided by the payment provider 136 (as part of step S502 in FIG. 5). The confirmation page 646 displays a summary of the payment to be made (as shown in region 648) for the user to review. The source of the payment funds, as selected up by the user when he set up the account with the payment provider is indicated at 649. If required, the payment source can be changed by selecting the "change" hyperlink. Possible payment sources include credit/debit cards, bank accounts or a stored balance with the payment provider. If the user is happy with the details shown in region 648, then a button labelled "send money now" 650 is activated by the user, to confirm that the payment should go ahead. A final page 652 (shown in FIG. 6G) is then displayed to the user to confirm that the payment has been sent. When User A 102 selects the "done" button 654, the pop-up window is closed, and the communication between the client 110 of User A 102 and the payment provider 136 in step S502 of FIG. 5 ends.

Referring again to FIG. 5, the payment provider 136, on receiving confirmation to proceed with the transfer of the money, initiates the sending of a message to the recipient of the money (i.e. User B 118). The message is sent using a messaging system 140. The messaging system provides a messaging interface between the internet and the VoIP communication system, so that an entity that is external to the VoIP system (such as the payment provider 136) can send a message to the client of a user of the VoIP communication system. An example messaging system of this type is described in co-pending patent application no. GB0702763.4.

More specifically, the messaging system 140 provides a secure application programming interface (API) 142, which can be accessed by authorised users of the messaging system. In this case, the payment provider 136 is such an authorised user. The payment provider 136 prepares a message notifying User B 118 of the payment that has been made to him and containing details of the payment, and transmits this to the secure API 142 along with the VoIP ID of User B 118 in step S504 in FIG. 5. The VoIP ID of User B 118 was provided to the payment provider as part of the information entered by User A 102 in FIG. 6E (see field 634).

The messaging system 140 processes the message to User B and transmits it over the VoIP communication system via P2P interface 144. This is illustrated in step S506, whereby the message is transmitted via peer 122 and 124 before being delivered to user terminal 126. This is merely an example route for the message for the purposes of illustration.

Figures 7A, 7B:
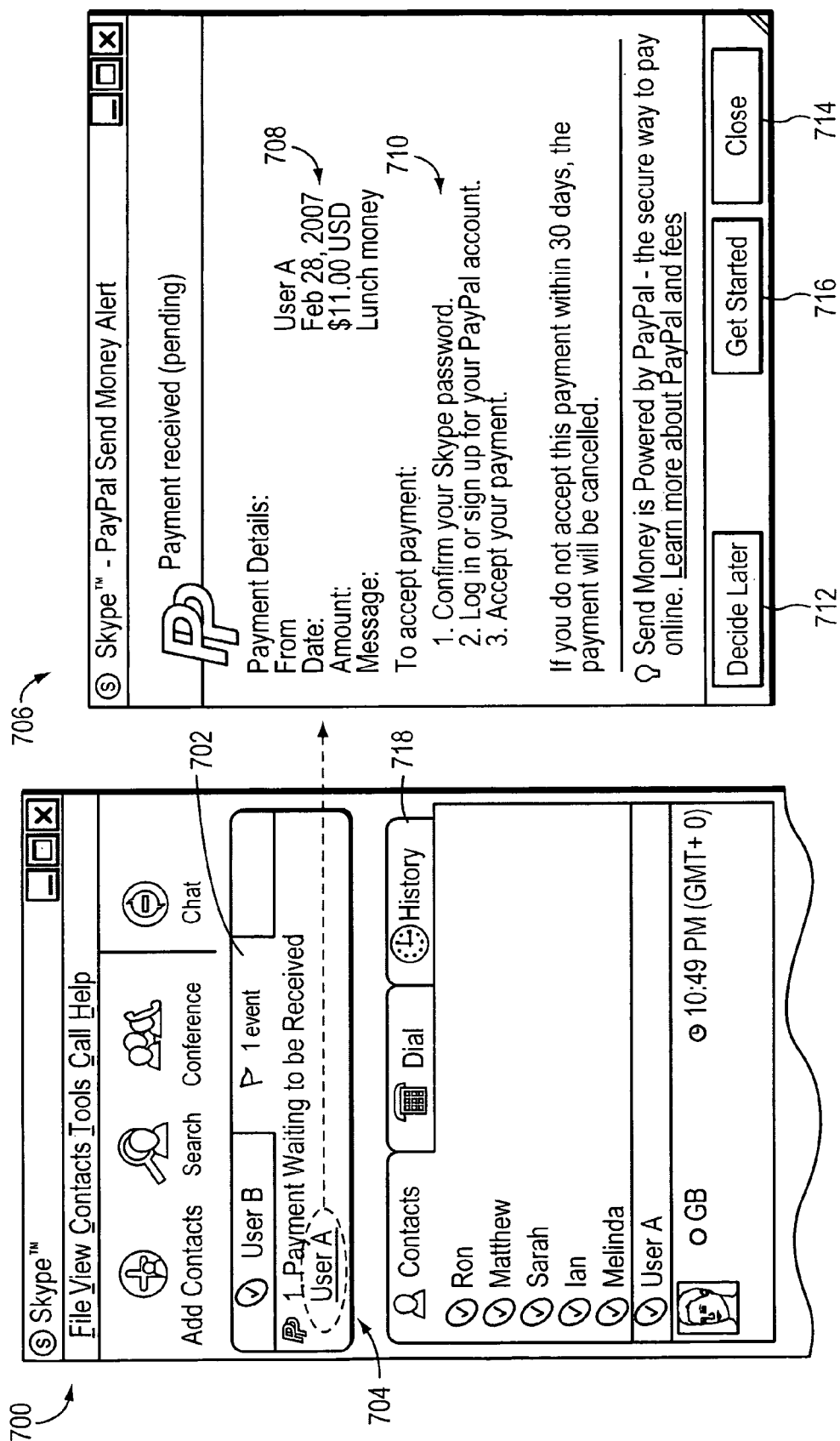
FIG. 7A shows a VoIP client UI displayed to a first-time receiver of money.
FIG. 7B shows an instruction UI displayed to a first-time receiver of money.

Reference is now made to FIG. 7A, which illustrates a UI 700 for the client 130 executed on user terminal 126 of User B 118. In the UI 700 shown in FIG. 7A, User B has received the message transmitted by the payment provider 136. Notification of the message is displayed to User B 118 in an events pane 702. In particular, events pane 702 displays a notification message 704, indicating to User B 118 that he has a payment that is waiting to be received from User A 102. The name of the sender of the money (User A 102) is hyperlinked in the notification 704, such that when User B 118 clicks on the hyperlink, a pop-up window is displayed. If this is the first time that User B 118 has received a payment over the VoIP system, then the pop-up window 706 shown in FIG. 7B is displayed.

Pop-up window 706 shown in FIG. 7B provides instructions to User B 118 regarding how to claim the money that has been sent to him. More specifically, pop-up window 706 displays information about the payment 708, including details of the sender of the money (User A 102), the date, the amount, and any message that was entered by the sender (as was described above with reference to message field 642 in FIG. 6E). The pop-up window 706 also provides step-by-step instructions 710 for how the payment can be accepted. The information displayed in the pop-up window is provided in the message transmitted from the payment provider 136, via the messaging system 140 in step S506 (as shown in FIG. 5), and does not need to be fetched from a server.

Figure 7C:
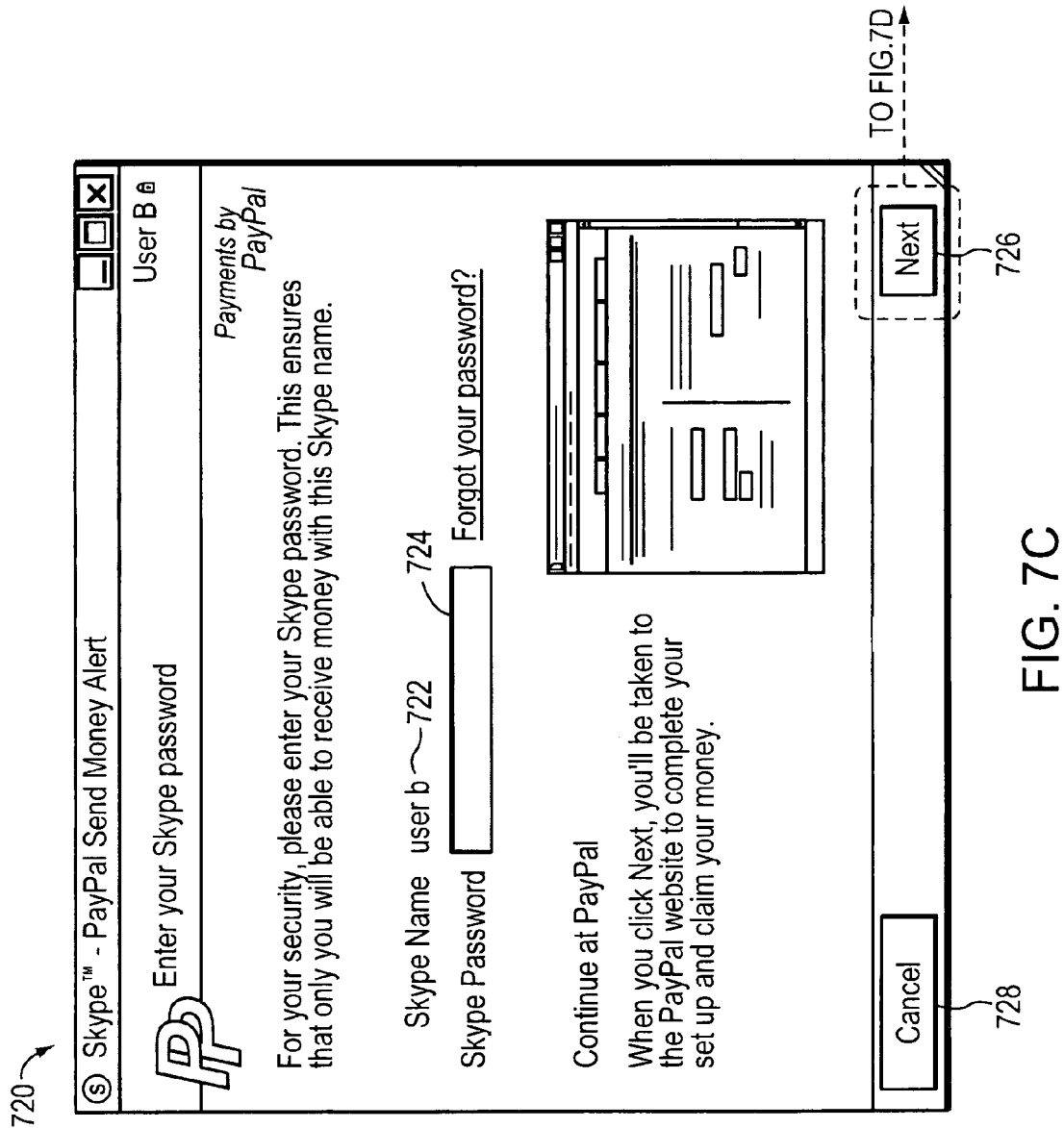
FIG. 7C shows a VoIP authorisation UI displayed to a first-time receiver of money.

Pop-up window 706 comprises three buttons. The first is a "decide later" button 712, which, when activated by User B 118, closes the pop-up window, but the notification message 704 is retained in the events pane 702 of the client UI 700 shown in FIG. 7A. The second button is a "close" button 714, which, when activated by User B 118, closes the pop-up window 706 and also removes the notification message 704 from the events pane 702 of client UI 700 in FIG. 7A. However, the notification message 704 is not deleted, but can be viewed again by User B by selecting history tab 718 in the client UI shown in FIG. 7A. The third button is a "get started" button 716. When User B 118 activates the "get started" button 716, then pop-up window displays an authorisation page 720 shown in FIG. 7C.

The authorisation page 720 is provided by a webserver 134 of the VoIP system (as shown in step S508), and is used to confirm the identity of User B 118, by requesting him to enter his password. The username of User B 118 in the VoIP system (i.e. the VoIP ID of User B) is displayed at 722, and a password field is shown at 724. To proceed with receiving the money sent to him, User B 118 must enter his password in the field 724. When User B 118 has entered his password in field 724, then the process can be continued by User B activating "next" button 726. Alternatively, User B can cancel the process and close the pop-up window by selecting "cancel" button 728.

When User B 118 has entered the password in the password field 724 and activated the "next" button 726, the password is verified by the VoIP authorisation DB 114 in step S510, as shown in FIG. 5. If the password is incorrect, the user is invited to re-enter it. If the password is correctly verified, then the VoIP authorisation DB 114 transmits the VoIP identity of User B 118 to a linking server 146 in step S512. The linking server 146 is a server operated by an entity that is trusted by both the VoIP software provider and the payment provider 136. In one embodiment the linking server 146 is operated by a third party. In alternative embodiments, the linking server may be operated by an entity related to either or both of the VoIP software provider and the payment provider 136. Communications between the VoIP authorisation DB 114 and the linking server 146 utilise a secure communication protocol.

The purpose of the linking server 146 is to link together the authorisation of the user in the VoIP system with the authorisation of the user with the payment provider. This only needs to be performed the first time that a user receives money. Upon receiving the VoIP identity of User B 118 from the VoIP authorisation DB 114 in step S512, the linking server 146 generates a one-time session token, which has a short life-span. The token is passed back to the VoIP authorisation DB 114, which returns it to the client 130 as part of the confirmation of correctly entering authentication details in step S510. This token is used to link the VoIP and payment provider authorisations, as described in more detail hereinafter.

Returning again to FIG. 7C, subsequent to User B 118 correctly entering his authorisation details and selecting the "next" button 726, the client 130 triggers the execution of a web-browser program. The client 130 opens the web-browser program such that the web-browser navigates immediately to a website of the payment provider 136, as illustrated in step S514 of FIG. 5. The website of the payment provider 136 fetched and displayed in the web-browser program is shown in FIG. 7D.

Figure 7D:
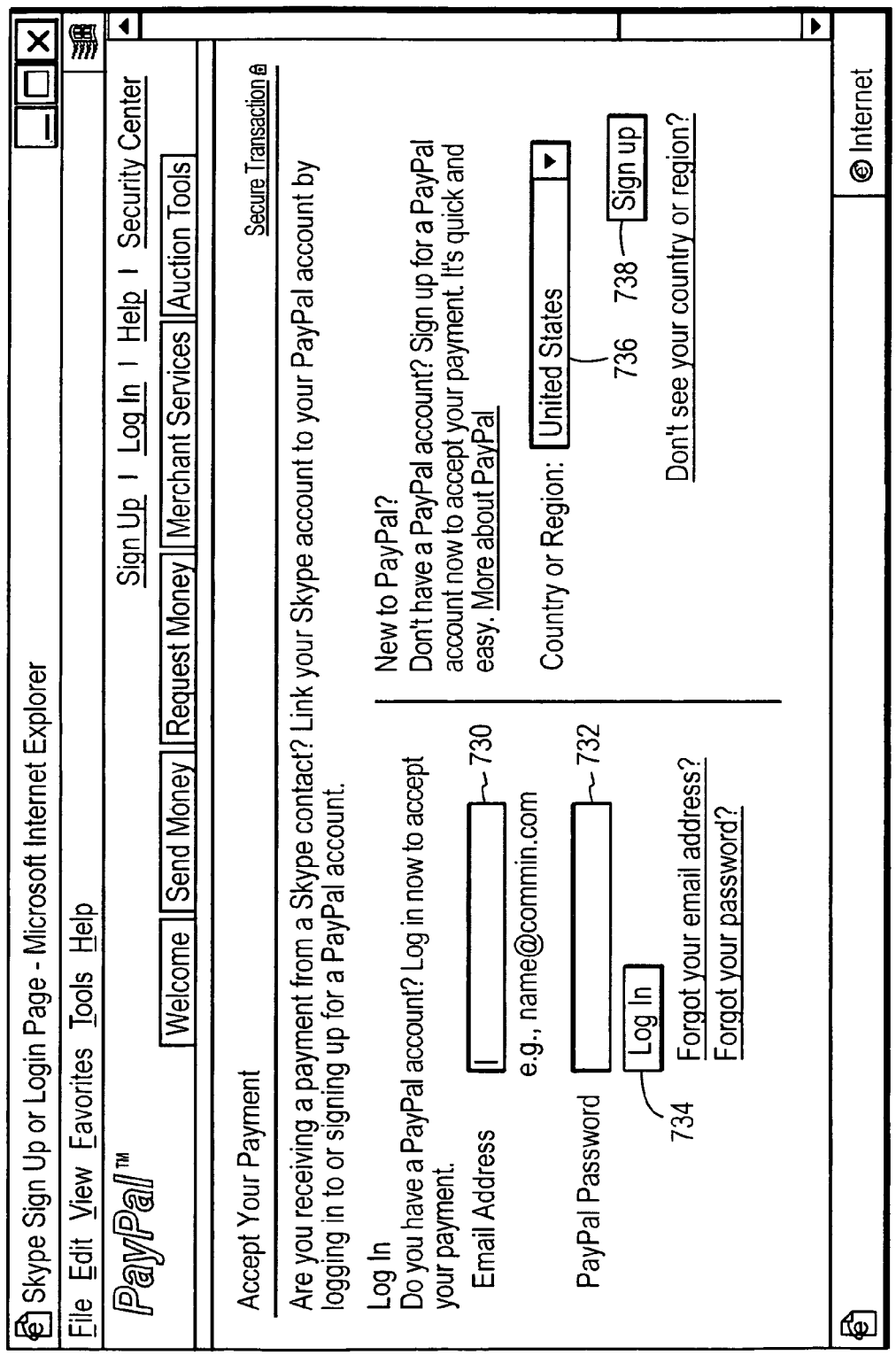
FIG. 7D shows a payment provider authorisation website page displayed to a first-time receiver of money.

The payment provider website shown in FIG. 7D requires the user (User B 118 in this example) to enter his login details for the payment provider 136. The website comprises a username (in this example email address) field 730 and a password field 732, and User B can transmit these authentication details to the payment provider 136 (to be verified by the payment provider authorisation DB 138) by selecting a "log in" button 734. In addition to transmitting the authentication details, the session token generated by the linking server 146 is also transmitted to the payment provider 136.

Alternatively, if User B 118 does not already have an account with the payment provider 136, he can sign up for an account by selecting his country using drop-down list 736 and selecting "sign up" button 738. Following the activation of the "sign up" button 738. User B 118 is presented with a sequence of website pages provided by the payment provider 136 that allow the user to sign up for an account with the payment provider 136. This sequence of website pages are dependent on the payment provider, and are not described in more detail here.

Following the authorisation with the payment provider in step S514, the payment provider 136 credits the account of User B 118 with the amount sent to User B 118 by User A 102 (minus any fees that are taken by the payment provider) and debits the account of User A 102. This therefore completes the process of sending money from User A 102 to User B 118.

In addition, the payment provider also attempts to link the accounts of the user in the VoIP system and with the payment provider, using the session token provided to the payment provider in step S514. The payment provider communicates with the linking server 146 (using a secure communication protocol) to verify the token that it has received in step S516. When the token has been verified by the linking server 146, the payment provider 136 transmits the payment provider username of User B 118 (i.e. User B's email address—see field 730) to the linking server. As the two usernames of User B 118 in the VoIP system (i.e. the VoIP ID of User B) and with the payment provider (i.e. the email address of User B) are now both known to the linking server 146, and User B 118 is simultaneously logged-in to both accounts in the same session (as proven by the matching token provided by the payment provider in S516), then the linking server can store these two identities for the two different systems and create a link between them.

As a result of the linking process, the payment provider 136 can, for subsequent payments, communicate with the linking server 146 in order to confirm the payment provider username that is linked to a given VoIP ID. This allows the payment provider 136 to have sufficient trust in the user's VoIP identity to allow money sent to the user to be automatically and immediately deposited into the user's payment provider account for subsequent payments (thereby allowing the two-stage authentication in FIGS. 7C and 7D to be skipped for subsequent payments). The effect of such a linking of the authorisations between the VoIP system and the payment provider is illustrated in FIGS. 8A and 8B. Note that the user may also be provided with the option to link the VoIP and payment provider accounts in advance of receiving a first payment. This can be performed by providing an option in the VoIP client to perform the two-stage authorisation process described above (i.e. entering both VoIP and payment provider authorisation details) at any time, without a payment needing to be received.

FIG. 8A illustrates the client UI 700, which displays a notification message 802 indicating that there is a payment that has been received for User B (similar to that described above with reference to 704 in FIG. 7A). However, in the example of FIGS. 8A and 8B, User B 118 has previously logged into both the VoIP system and the payment provider 136 as in FIGS. 7C and 7D, and thus User B's accounts have been linked at the linking server 146. As a result of this, the payment provider 136 can determine the payment provider username for User B 118 from the linking server 146 by providing User B's VoIP ID, and does not require further authorisation. Therefore, the payment can be credited directly into User B's account with the payment provider immediately, without User B 118 needing to enter any authorisation details, and the money is deposited into User B's account without any action on the part of User B.

The depositing of the money into his account is confirmed to User B in pop-up window 800 shown in FIG. 8B, which is shown in response to User B clicking on the hyperlink in the notification message 704. Therefore, as a result of the linking of the accounts, the money is received very easily by the user, without the requirement to log into multiple accounts. Note, however, that in some circumstances User B may be prompted in a notification message to accept the payment before it is deposited, even if the accounts have been linked. For example, this may occur if the payment provider is taking a fee from the money, in which case User B 118 must accept this fee before the money is deposited. Similarly, the user may be asked to accept a particular exchange rate for a given currency.

While this invention has been particularly shown and described with reference to preferred embodiments, it will be understood to those skilled in the art that various changes in form and detail may be made without departing from the scope of the invention as defined by the appendant claims. For example, the message transmitted from the payment provider 136 to User B 118 may, in alternative embodiments, be sent as an email message over the internet or a short message service ("SMS") message over a cellular network, rather than being transmitted over the VoIP communication system. In this case, the recipient of the money is identified by an email address or mobile phone number, rather than by a VoIP ID.

What is claimed is:

1. A method of transferring a payment between a first user of a communication system and a second user of the communication system, comprising:
    displaying a contact list comprising said second user in a user interface of a client executed at a user terminal of the first user, said client being a computer program downloaded and executed on said user terminal of the first user;
    said client retrieving and displaying at least one page from a payment provider responsive to said first user selecting a payment transfer option in the user interface;
    said client automatically identifying the second user as a recipient of said payment in said at least one page retrieved from the payment provider responsive to said first user selecting the second user from the contact list, and receiving information related to said payment entered into said at least one page by said first user; and
    said client transmitting said information related to said payment to said payment provider to cause said payment provider to transmit a message to a user terminal of the second user over the communication system and transfer said payment from an account of the first user to an account of the second user by linking together authorisation information of the second user in the communication system with authorisation information of the second user in the payment provider using an entity that is trusted by both the communication system and the payment provider.

2. A method according to claim 1, wherein the communication system is a voice over internet protocol communication system.

3. A method according to claim 1, wherein the communication system is an instant messaging communication system.

4. A method according to claim 1, wherein the step of said first user selecting the second user comprises detecting the activation by the first user of a displayed name of the second user displayed in the user interface of the client.

5. A method according to claim 1, wherein said step of retrieving said at least one page from the payment provider comprises downloading said at least one page over the Internet.

6. A method according to claim 5, wherein said downloading of said at least one page over the Internet uses HTTPS protocol.

7. A method according to claim 1, wherein said step of displaying said at least one page from the payment provider comprises said client triggering the display of a pop-up window, wherein said at least one page is displayed in said pop-up window.

8. A method according to claim 1, wherein said information related to said payment is transmitted to said payment provider over the Internet.

9. A method according to claim 8, wherein said information related to said payment is transmitted over the Internet using HTTPS protocol.

10. A method according to claim 1, wherein said information related to said payment comprises payment provider authorisation information for the first user.

11. A method according to claim 10, wherein said payment provider authorisation information for the first user comprises a payment provider username and a payment provider password.

12. A method according to claim 11, wherein the username is an email address for the first user.

13. A method according to claim 1, wherein said information related to said payment comprises an identity of the second user in the communication system.

14. A method according to claim 13, wherein the identity of the second user in the communication system comprises a communication system username of the second user.

15. A method according to claim 1, wherein said information related to said payment comprises at least one of a payment amount, a currency, and a message.

16. A method according to claim 1, wherein said message transmitted by said payment provider is transmitted to a secure interface of a messaging system over the Internet, and forwarded by said messaging system over said communication system to the user terminal of the second user.

17. A method according to claim 1, wherein said message transmitted by said payment provider is an email message transmitted to an email address of the second user.

18. A method according to claim 1, wherein said message transmitted by said payment provided is an SMS message transmitted to a telephone number of said second user.

19. A method according to claim 1, further comprising the step of said user terminal of the second user receiving said message in a client program executed at the user terminal of the second user.

20. A method according to claim 1, wherein said authorisation information of the second user is provided for an initial payment by the steps of authorising said second user with the communication system, authorising said second user with the payment provider, and transmitting an acceptance message from said user terminal of said second user to said payment provider to initiate the transfer of said initial payment.

21. A method according to claim 1, wherein the step of linking comprises storing the authorisation information of the second user in the communication system and the authorisation information of the second user in the payment provider at a network node.

22. A method according to claim 21, wherein the authorisation information of the second user in the communication system is a communication system username of the second user, and the authorisation information of the second user in the payment provider is a payment provider username of the second user.

23. A method according to claim 1, wherein the communication system is a peer-to-peer communication system.

24. A computer program product comprising program code means for performing steps of a method of transferring a payment between a first user of a communication system and a second user of the communication system, the steps comprising:
  displaying a contact list comprising said second user in a user interface of a client executed at a user terminal of the first user, said client being a computer program downloaded and executed on said user terminal of the first user;
  said client retrieving and displaying at least one page from a payment provider responsive to said first user selecting a payment transfer option in the user interface;
  said client automatically identifying the second user as a recipient of said payment in said at least one page retrieved from the payment provider responsive to said first user selecting the second user from the contact list, and receiving information related to said payment entered into said at least one page by said first user; and
  said client transmitting said information related to said payment to said payment provider to cause said payment provider to transmit a message to a user terminal of the second user over the communication system and transfer said payment from an account of the first user to an account of the second user by linking together authorisation information of the second user in the communication system with authorisation information of the second user in the payment provider using an entity that is trusted by both the communication system and the payment provider.

25. A system for transferring a payment between a first user of a communication system and a second user of the communication system, comprising:
  a user terminal of said first user arranged to execute a client and display a contact list comprising said second user in a user interface of said client, said client being a computer program downloaded and executed on said user terminal of the first user; and
  a payment provider;
  said client configured to retrieve and display at least one page from the payment provider responsive to said first user selecting a payment transfer option in the user interface, automatically identify the second user as a recipient of said payment in said at least one page retrieved from the payment provider responsive to said first user selecting the second user from the contact list, receive information related to said payment entered into said at least one page by said first user, and transmit said information related to said payment to said payment provider; and the payment provider arranged to transmit a message from said payment provider to a user terminal of the second user over the communication system responsive to receiving said information related to said payments, and transfer said payment from an account of the first user to an account of the second user; the system further comprising a network node arranged to link authorisation information of the second user in the communication system with authorisation information of the second user in the payment provider wherein the network node is trusted by both the communication system and the payment provider.

26. A system according to claim 25, wherein the communication system is a voice over internet protocol communication system.

27. A system according to claim 25, wherein the communication system is an instant messaging communication system.

28. A system according to claim 25, wherein the client is configured to detect the selection by the first user of a displayed name of the second user displayed in the user interface of the client.

29. A system according to claim 25, wherein said client is arranged to download said at least one page over the Internet.

30. A system according to claim 29, wherein said client is configured to use HTTPS protocol to download said at least one page over the Internet.

31. A system according to claim 25, wherein said client is further configured to trigger the display of a pop-up window, wherein said at least one page is displayed in said pop-up window.

32. A system according to claim 25, wherein said information related to said payment is transmitted to said payment provider over the Internet.

33. A system according to claim 32, wherein said information related to said payment is transmitted over the Internet using HTTPS protocol.

34. A system according to claim 25, wherein said information related to said payment comprises payment provider authorisation information for the first user.

35. A system according to claim 25, wherein said payment provider authorisation information for the first user comprises a payment provider username and a payment provider password.

36. A system according to claim 35, wherein the username is an email address for the first user.

37. A system according to claim 25, wherein said information related to said payment comprises an identity of the second user in the communication system.

38. A system according to claim 37, wherein the identity of the second user in the communication system comprises a communication system username of the second user.

39. A system according to claim 25, wherein said information related to said payment comprises at least one of a payment amount, a currency, and a message.

40. A system according to claim 25, further comprising a messaging system, wherein said payment provider is configured to transmit said message to a secure interface of said messaging system over the Internet, and said messaging system is arranged to forward said message over said communication system to the user terminal of the second user.

41. A system according to claim 25, wherein said user terminal of the second user comprises a client program executed at the user terminal of the second user and configured to receive said message.

42. A system according to claim 25, further comprising a network node arranged to authorize said second user with the communication system, a network node arranged to authorize said second user with the payment provider, and wherein said user terminal of said second user is arranged to transmit an acceptance message from said user terminal of said second user to said payment provider to initiate the transfer of initial payments, thereby to provide said authorisation information.

43. A system according to claim 25, wherein the network node comprises a storage device for storing the authorisation information of the second user in the communication system and the authorisation information of the second user in the payment provider.

44. A system according to claim 43, wherein the authorisation information of the second user in the communication system is a communication system username of the second user, and the authorisation information of the second user in the payment provider is a payment provider username of the second user.

45. A system according to claim 25, wherein said message transmitted by said payment provider is an email message transmitted to an email address of the second user.

46. A system according to claim 25, wherein said message transmitted by said payment provided is an SMS message transmitted to a telephone number of the second user.

47. A system according to claim 25, wherein the communication system is a peer-to-peer communication system.

48. A user terminal for transferring a payment between a first user of a communication system and a second user of the communication system, comprising:

a processor arranged to execute a client; and a display arranged to display a contact list comprising said second user to said first user in a user interface of said client, said client being a computer program downloaded and executed on said user terminal of the first user;

wherein said client is configured to retrieve and display at least one page from a payment provider responsive to said first user selecting a payment transfer option in the user interface, automatically identify the second user as a recipient of said payment in said at least one page retrieved from the payment provider responsive to said first user selecting the second user from the contact list, receive information related to said payment entered into said at least one page by said first user, and transmit said information related to said payment to said payment provider to cause said payment provider to transmit a message to a user terminal of the second user over the communication system responsive to receiving said information related to said payments and transfer said payment from an account of the first user to an account of the second user by linking together authorisation information of the second user in the communication system with authorisation information of the second user in the payment provider using an entity that is trusted by both the communication system and the payment provider.

* * * * *